(No Model.)
H. B. TADDICKEN.
VESSEL FOR MEASURING ICE CREAM.
No. 283,165. Patented Aug. 14, 1883.
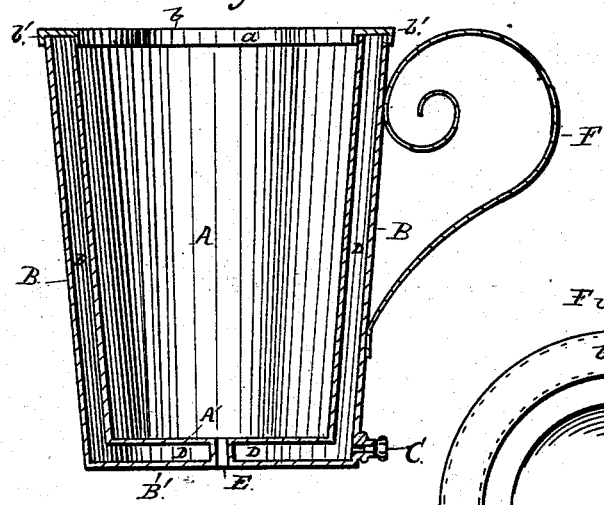
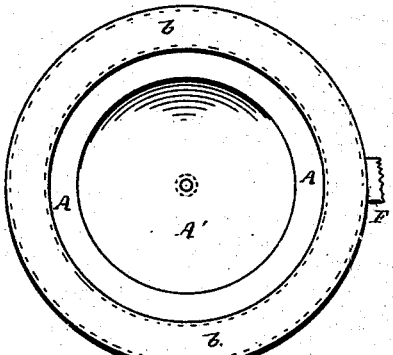
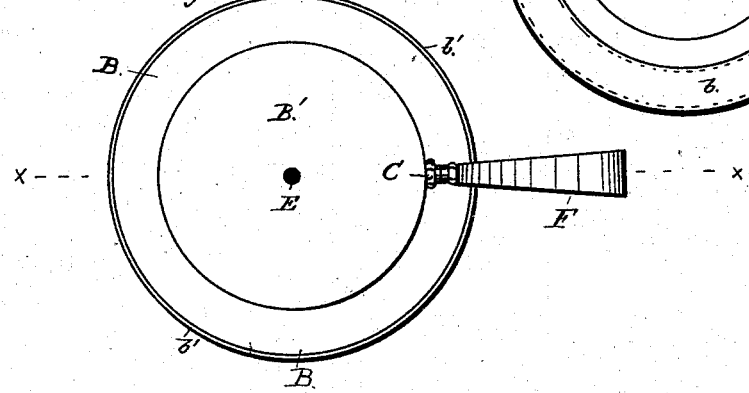
WITNESSES
Morton Toulmin
C. J. Martin
INVENTOR
Henry B. Taddicken
W. F. Fitzgerald
Attorney

UNITED STATES PATENT OFFICE.

HENRY B. TADDICKEN, OF MUSCATINE, IOWA.

VESSEL FOR MEASURING ICE-CREAM.

SPECIFICATION forming part of Letters Patent No. 283,165, dated August 14, 1883.

Application filed February 2, 1883. (No model.)

*To all whom it may concern:*

Be it known that I, HENRY B. TADDICKEN, a citizen of the United States, residing at Muscatine, in the county of Muscatine and State of Iowa, have invented certain new and useful Improvements in Vessels for Measuring Ice-Cream; and I do hereby declare the following to be a full, clear, and exact description of the invention, such as will enable others skilled in the art to which it appertains to make and use the same.

This invention relates to improvements in measuring vessels for ice-cream, and has for its object to prevent the cream from freezing to the sides and bottom of the measure, and to cause it to slip out readily, smooth and solid, without any trouble. This object is attained by the construction shown in the drawings forming a part of this specification, in which—

Figure 1 is a vertical section taken on the line $x$ $x$ of Fig. 2. Fig. 2 is a view taken from the bottom of the measure. Fig. 3 is a view taken from the top with the handle broken away.

The measure consists in an inner vessel, A, made of tin or other suitable material, and an outer vessel, B, secured at the top by the cap $b$ and at the bottom by the tube E, which penetrates both vessels. A' is the bottom of the inner vessel. B' is the bottom of the outer vessel. The cap $b$ has outer and inner flanges, $b'$ and $a$, and is soldered to the outer vessel, B, and to the inner vessel, A, leaving a space between the two vessels of about one-quarter of an inch. The soldered joint should be perfectly air-tight. The air-pipe E penetrates the bottom A' as well as the bottom B', in the center of which it is placed, and steadies both, as well as permitting the air from the outside to enter into the inner vessel, A. D is the open space between the two vessels. C is a valve or cock, which permits the introduction of water between the two vessels into the space D.

Ice-cream dealers experience a great deal of trouble in measuring the cream, for the cold cream put into a common measure will freeze to the sides and bottom. This difficulty is overcome by this ice-cream measure by keeping the space D between the outer and inner vessels filled with water, which prevents the cream from freezing to the sides of the measure. The pipe E admits the pressure of the air as soon as the measure is tipped over, causing the cream to slip out readily, smooth and solid, without any trouble.

Having described my invention, what I claim, and desire to secure by Letters Patent, is—

1. In an ice-cream measure, an outer and inner vessel having a space between the two adapted to hold water, and an air-pipe penetrating the bottom of each vessel, as described, and for the purposes set forth.

2. In an ice-cream measure, the cap $b$ and the air-pipe E, in combination with the inner vessel, A, and the outer vessel, B, substantially as described, and for the purposes set forth.

3. The combination, in an ice-cream measure, of the cap $b$, the inner vessel, A, the outer vessel, B, and the pipe E, with the valve C, substantially as described, and for the purposes set forth.

In testimony whereof I affix my signature in presence of two witnesses.

HENRY B. TADDICKEN.

Witnesses:
JOHN SCHMIDT,
GEORGE J. SCHMIDT.